US010289585B1

(12) United States Patent
Chromczak (10) Patent No.: US 10,289,585 B1
(45) Date of Patent: May 14, 2019

(54) CROSS-POINT PROGRAMMING OF PIPELINED INTERCONNECT CIRCUITRY

(71) Applicant: Altera Corporation, San Jose, CA (US)

(72) Inventor: Jeffrey Christopher Chromczak, Brownsville (CA)

(73) Assignee: Altera Corporation, San Jose, CA (US)

( * ) Notice: Subject to any disclaimer, the term of this patent is extended or adjusted under 35 U.S.C. 154(b) by 1079 days.

(21) Appl. No.: 14/464,237

(22) Filed: Aug. 20, 2014

(51) Int. Cl.
*G06F 13/00* (2006.01)
*G06F 13/40* (2006.01)
*G06F 13/42* (2006.01)

(52) U.S. Cl.
CPC .............. *G06F 13/40* (2013.01); *G06F 13/42* (2013.01)

(58) Field of Classification Search
CPC ........ G06F 13/28; G06F 13/4221; G06F 3/00; G06F 13/1615
USPC ......................................... 710/305–306, 100
See application file for complete search history.

(56) References Cited

U.S. PATENT DOCUMENTS

| 7,254,075 | B2 | 8/2007 | Woo et al. |
| 7,505,356 | B2 | 3/2009 | Ware et al. |
| 7,743,175 | B1* | 6/2010 | Young ................. G06F 13/4045 326/38 |
| 7,755,968 | B2 | 7/2010 | Woo et al. |
| 7,907,470 | B2 | 3/2011 | Ware et al. |
| 7,940,598 | B2 | 5/2011 | Kasamsetty et al. |
| 7,984,272 | B2 | 7/2011 | Luick |
| 8,050,134 | B2 | 11/2011 | Ware et al. |
| 2006/0117114 | A1* | 6/2006 | Verma ................. G06F 13/1615 710/5 |
| 2014/0258620 | A1* | 9/2014 | Nagarajan ........... G06F 12/0815 711/120 |

* cited by examiner

*Primary Examiner* — Tim T Vo
*Assistant Examiner* — Kim T Huynh
(74) *Attorney, Agent, or Firm* — Treyz Law Group, P.C.; Jason Tsai (57) ABSTRACT

An integrated circuit may have pipelined programmable interconnects that are configured to select between a routing signal stored in storage nodes of a pipeline element and the identical routing signal bypassing the pipeline element. A programming element may access the storage nodes of the pipeline elements for write operations and, if desired, for read operations. For example, the programming element may perform write operations to initialize the storage nodes to a known state during power-up operations or to reset the pipeline element. In addition, the programming element may perform reed operations for debug and testing purposes.

24 Claims, 8 Drawing Sheets

CROSS-POINT PROGRAMMING OF PIPELINED INTERCONNECT CIRCUITRY

BACKGROUND

This invention relates to integrated circuits and, more particularly, to pipelined interconnect circuitry and access to a pipeline element in the pipelined interconnect circuitry on an integrated circuit.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, Which have led to performance increases. However, more recent technology nodes have seen a significant slow-down in the reduction of delays (i.e., a slow-down in the performance increase).

To further increase the performance, solutions such as register pipelining have been proposed, where additional registers are inserted between synchronous elements, thereby increasing latency for the benefit of increased clock frequencies and throughput. However, performing register pipelining often involves spending significant time and effort because several iterations of locating performance bottlenecks, inserting and removing registers, and compiling the modified integrated circuit design are usually required.

Situations frequently arise where a register pipelined integrated circuit design still exhibits an unsatisfactory performance after many iterations of inserting and removing registers because synchronous elements are placed far from each other and existing routing architectures don't support a high speed connection across the integrated circuit in an efficient manner.

SUMMARY

In accordance with certain aspects of the invention, an integrated circuit may have an interconnect circuit, a pipeline storage element that is coupled to a segment of the interconnect circuit, an address line, a data line, and a transistor that is coupled to the data line, the address line, and the pipeline storage element and that provides access to the pipeline storage element via the address line and the data line.

The interconnect circuit may route a signal from a first circuit to a second circuit, and the pipeline storage element may be configurable to store the signal. If desired, the pipeline storage element may include first and second inverters that have inputs and outputs. The input of the first inverter may be coupled to the output of the second inverter and to the transistor, and the input of the second inverter may be coupled to the output of the first inverter and to the interconnect circuit.

It is appreciated that the present invention can be implemented in numerous ways, such as a process, an apparatus, a system, a device, or a method on a computer readable medium. Several inventive embodiments of the present invention are described below.

In certain embodiments, the above-mentioned pipeline storage element may include a control circuit and a transmission gate that is coupled between the output of the first inverter and the input of the second inverter. The control circuit may be coupled to the transmission gate and generate a control signal that controls the transmission gate.

If desired, the control circuit may include a logic NAND gate that receives first and second additional signals and that controls at least a portion of the transmission gate based on the first and second additional signals. The control circuit may further include a configuration memory that is coupled to the logic NAND gate. For example, the configuration memory may store the first additional signal.

Further features of the invention, its nature and various advantages, will be more apparent from the accompanying drawings and the following detailed description of the preferred embodiments.

DETAILED DESCRIPTION

The present invention relates to integrated circuits and, more particularly, to pipelined interconnect circuitry and the access to the pipeline element in the pipelined interconnect circuitry on an integrated circuit.

As the functionality implemented per unit of die area continues to increase, it becomes increasingly challenging for existing routing architectures to support a high speed connection across the die. Thus, situations frequently arise where the critical earn between sequential elements spans a large distance across the die.

It may therefore be desirable to improve the routing architecture by facilitating the use of register pipelining techniques, for example by including pipeline elements into the interconnection circuitry and providing access to the pipeline elements for read and write operations.

It will be recognized by one skilled in the art, that the present exemplary embodiments may be practiced without some or all of these specific details. In other instances, well-known operations have not been described in detail in order not to unnecessarily obscure the present embodiments.

Figure 1:
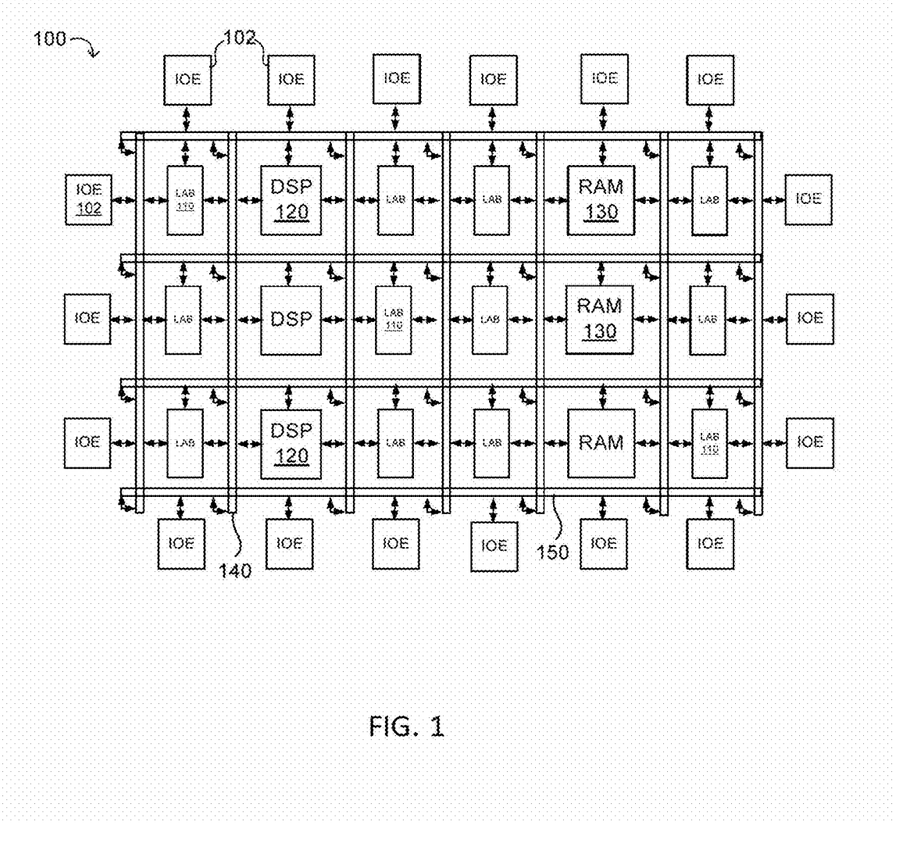
FIG. 1 is a diagram of an illustrative integrated circuit having an exemplary routing topology in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing Channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1 ½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
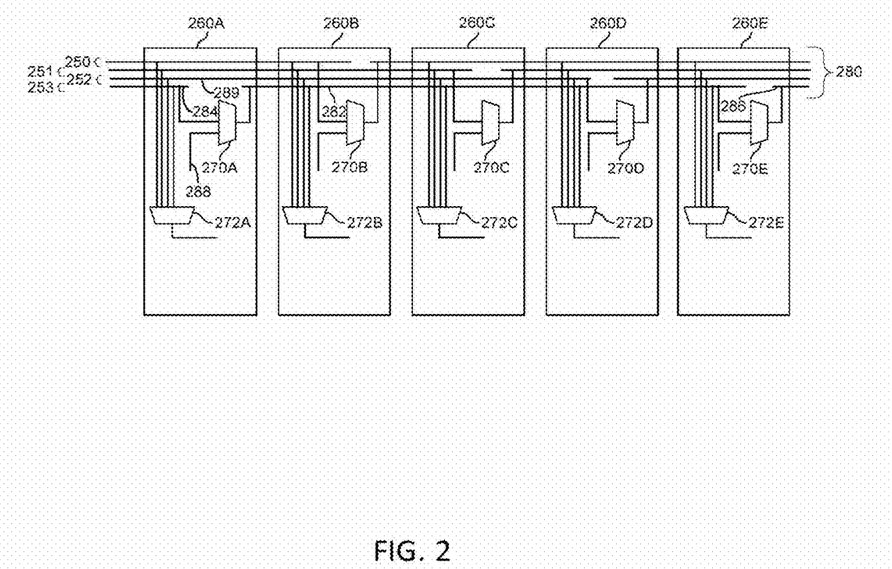
FIG. 2 is a diagram of an illustrative direct drive routing channel with staggered wires in accordance with an embodiment.

FIG. 2 shows a direct drive horizontal routing channel 280 including a single bundle of wires across functional blocks 260. Each functional block 260 may have a driver (not shown) to drive a signal on a wire that starts in the respective functional block (e.g., wire 286).

Each driver may be associated with a multiplexer such as an output multiplexer 270. For example, output multiplexer 270E may be configured to select a signal to drive on wire 286, and output multiplexer 270A may be configured to select a wire that ends in the respective functional block (e.g., wire 284). Connecting a wire that ends in a functional block to a wire that starts in that functional block is sometimes also referred to as "wire stitching" or stitching. If desired, tri-states may perform the wire stitching instead of output multiplexers 270, which may result in a bi-directional routing channel 280. Alternatively, wires may perform the wire stitching. In other words, wires may directly connect to other wires to implement a long wire (not shown).

If desired, output multiplexer 270E may be configured to select a signal from a different wire. For example, output multiplexer 270E may select a signal from a wire driven by a block within functional block 260E. Output multiplexer 270E may also select a signal from a wire in another routing channel such as a signal from a wire in a vertical routing channel that ends in the respective functional block (not shown).

Each functional block 260 may include one or more input multiplexers 272 (e.g., input multiplexer 272A in functional block 260A), which may be configured to route a wire of routine channel 280 to a block within the respective functional block 260.

As shown, each wire of routing channel 280 is unidirectional from left to right and has a length of four blocks (i.e., an H4 wire). In other words, a wire that starts in functional block 260A will end in the functional block 260E. If desired, routing channel 280 may be bi-directional (e.g., with tri-state buffers performing the wire stitching) or unidirectional from right to left (e.g., with output multiplexers performing wire stitching in the opposite direction as shown in FIG. 2). If desired, the wires in routing channel 280 may have any length. For example, the wires may have a length of two blocks which may require wire stitching in every other functional block 260.

Figure 3:
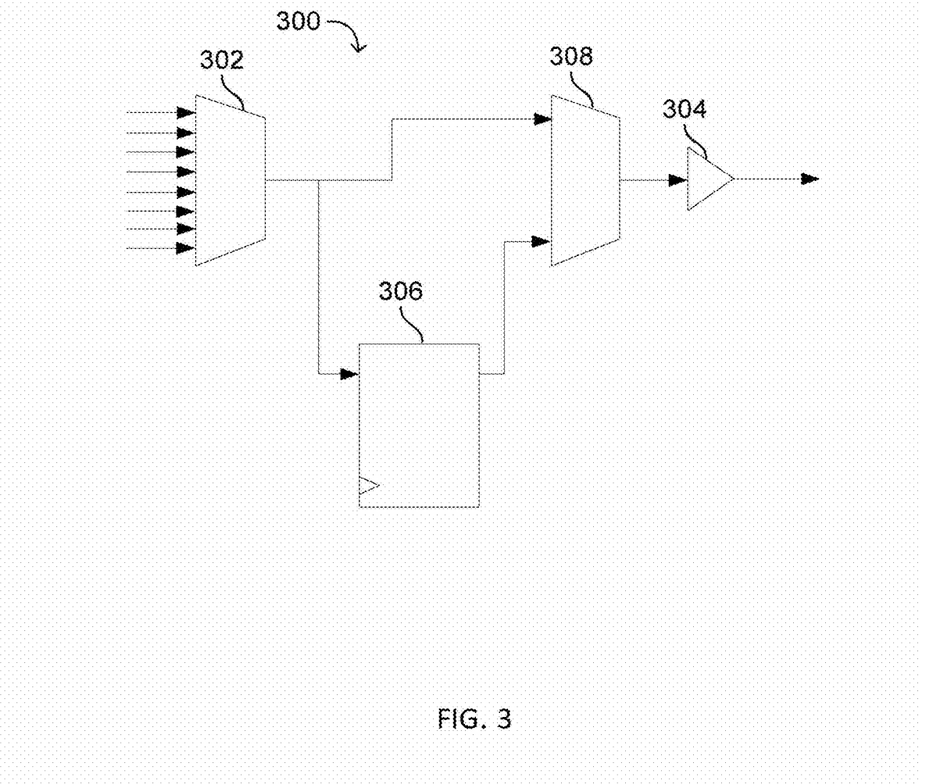
FIG. 3 is a diagram of an illustrative pipelined routing resource which uses a register to pipeline a routing signal in accordance with an embodiment.

If desired, routing channel 280 may include pipeline elements. FIG. 3 depicts a pipelined routing resource 300 which uses a register in accordance with an embodiment of the invention. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, in accordance with an embodiment of the invention, the multiplexer 302 may be pipelined by providing its output to the data input of register 306. Multiplexer 308 in the pipelined routing resource 300 may receive the output of multiplexer 302 directly and may also receive the data output from register 306.

Although the pipelined routing resource 300 includes a register, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302.

In the pipeline mode, multiplexer 308 may select the output of register 306. Multiplexer 308 may provide its output to driver circuit 304, and the output of driver circuit 304 may be used to drive a routing wire. The routine wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constraint to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Placing registers frequently may lead to many pipeline registers in the routing channels of an integrated circuit. Thus, it may he desirable to implement pipeline registers in an area-efficient way. For example, accessing the pipeline register for write operations (e.g., to perform asynchronous clear or asynchronous load operations or to initialize the pipeline register to a known state) or read operations (e.g., to perform a register scan for test purposes) may be particularly costly in terms of circuit area.

Figure 4:
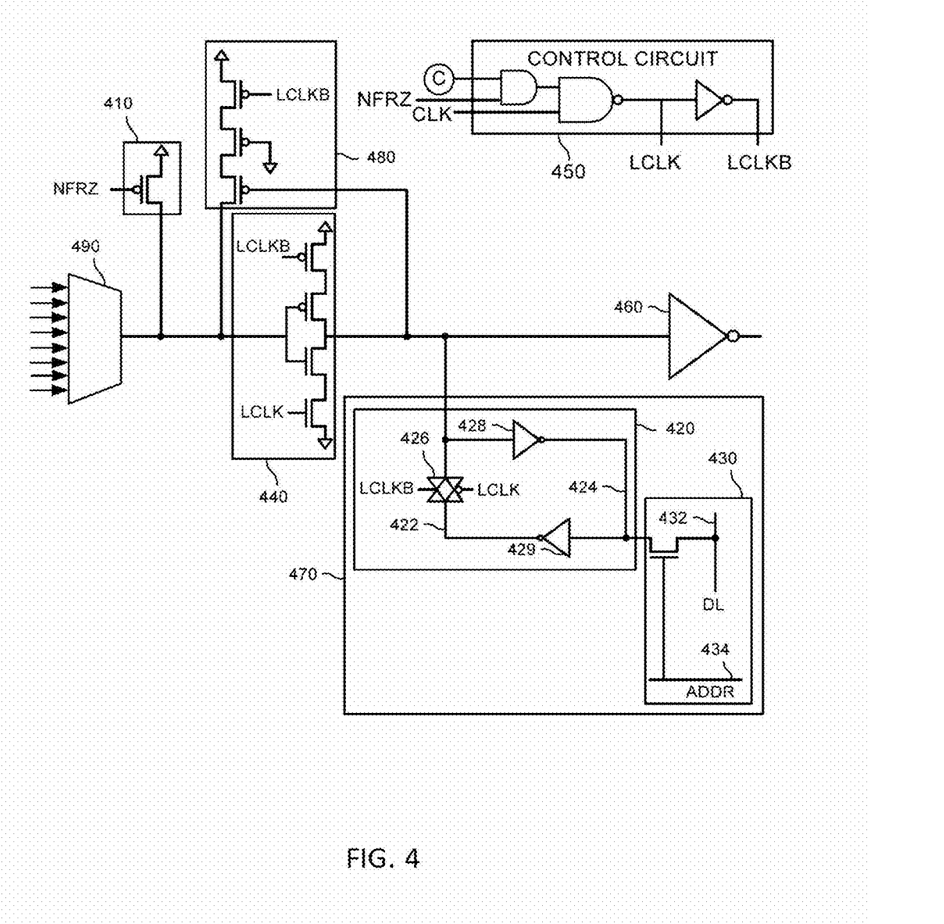
FIG. 4 is a diagram of an illustrative pipelined interconnect circuit with access to the pipeline element through a data line and an address line in accordance with an embodiment.

FIG. 4 shows an embodiment of an interconnect circuit, with a pipeline element, that enables optional storing of a signal With a small area overhead. As shown, the interconnect circuit may include initialization circuit 410, tri-state buffer 440, inverter 460, pull-up circuit 480, control circuit 450, pipeline element 470, and multiplexer 490.

Similar to multiplexer 302 of FIG. 3, multiplexer 490 may be a driver input multiplexer (DIM) or a functional block input multiplexer (FBIM). A DIM drives a routing wire and may select from multiple sources that can drive the wire. The multiple sources may include signals from outputs of functional blocks and other routing wires that travel in the same or in an orthogonal direction to the wire. A FBIM outputs a signal to a functional block and may select the signal from multiple routing wires.

Multiplexer 490 is merely illustrative and not intended to limit the scope of the invention. If desired, multiplexer 490 may be implemented as a one-hot, fully decoded routing multiplexer with an arbitrary number of inputs and one output. Each of the inputs may be coupled to the output through a pass transistor, and the pass transistors may be controlled by configuration memory (not shown). The pass transistors may be arranged in several different ways. For example, all pass transistors may be arranged in parallel, or multiplexer 490 may include multiple multiplexing stages, each having several pass transistors arranged in parallel, and the multiple multiplexing stages may be cascaded, just to name a few alternatives for arranging the pass transistors in multiplexer 490.

As shown, initialization circuit 410 may include a PMCS transistor that is controlled by an inverse freeze signal (NFRZ). A current may flow from the supply voltage through the PMOS transistor to the output of multiplexer 490 when the inverse freeze signal (NFRZ) is set to logic '0', thereby setting the output of multiplexer 490 to logic '1'. Initialization circuit 410 may electrically decouple the supply voltage from the output of multiplexer 490 when the inverse freeze signal (NFRZ) is set to logic '1'.

Pipeline element 470 may include pipeline storage element 420 and programming circuit 430. Pipeline storage element 420 may include inverters 428 and 429 and transmission gate 426, which may be controlled by signals LCLK and LCLKB. When signals LCLK and LCLKB are logic '0' and logic '1', respectively, transmission gate 426 may behave like a closed circuit, and cross-coupled inverters 428 and 429 may form a latch with first and second storage nodes 422 and 424, respectively, that store the signal at the input of inverter 460. In other words, pipeline storage element 420 may be in opaque (or non-transparent) latch mode Similarly, when signals LCLK and LCLKB are logic '1' and logic '0', respectively, transmission gate 426 may behave like an open circuit and the latch formed by cross-coupled inverters 428 and 429 may behave like a transparent latch. In other words, pipeline storage element may be in a transparent latch mode. If desired, inverter 428 may be omitted and the latch may be formed using inverters 460 and 429. For this purpose, the output of inverter 460 stay connect to storage node 424 (not shown).

Pipeline storage element 420 may be addressable. For example, programming circuit 430 may provide access to pipeline storage element 420 (e.g., for read and/or write access). Programming circuit 430 may include a data line 432, an address line 434, and a pass transistor which is controlled by address line 434 and which couples data line 432 to second storage node 424.

Buffered tri-state 440 may be controlled by signals LCLK and LCLKB with LCLKB being the inversion of LCLK. For example, buffered tri-state 440 may behave as an inverter when signal LCLK is logic '1' and signal LCLKB is logic '0'. The output of buffered tri-state 440 may be in a high-impedance state when signal LCLK is logic '0' and signal LCLKB is logic '1'.

As shown, pull-up circuit 480 may include three pass transistors coupled between a supply voltage rail and the output of multiplexer 490. If desired, pull-up circuit 480 may have two pass transistors instead of three (e.g., the pass transistor in the middle may be removed) or more than three pass transistors. In the event that signal LCLKB is logic '0' and the output of tri-state buffer 440 is logic '0', pull-up circuit 480 electrically connects the voltage rail to the output of multiplexer 490, thereby restoring the voltage level of a signal that is logic '1' and has dropped in voltage as a result of passing through the pass transistors of multiplexer 490.

Control circuit 450 may receive a clock signal (CLK), an inverted freeze signal (NFRZ), and an enable signal which may be stored in a configuration pipeline storage element. The inverted freeze signal (NFRZ) may be used during power-up operation of the integrated circuit, and the enable signal may be used to enable or disable the use of pipeline element 470. The clock signal (CLK) may provide a periodic signal, and pipeline element 470 may store signals based on the signals LCLK and LCLKB that are derived from the clock signal (CLK).

The ratio between the time during which a periodic clock signal is logic '1' and the time of the clock period is sometimes also referred to as the duty cycle of the clock signal. The duty cycle of clock signal (CLK) in FIG. 4 may be determined arbitrarily depending on the desired behavior of the pipeline storage element in the interconnect circuit.

Consider the example of a transparent-high latch that is controlled by a clock signal with a 50% duty cycle. In this example, the latch may behave like a wire half of the time (i.e., the time during which the clock signal is logic '1' and the latch is in a transparent state) and like a falling edge-triggered flip-flop the other half of the time (i.e., when the clock signal transitions from logic '1' to logic '0' and the latch transitions to an opaque state). In other words, the latch stores a signal during 50% of the clock period.

Now, consider the example of a transparent-high latch that is controlled by a clock signal with a duty cycle that approaches 0% (i.e., the clock signal appears to be a pulse). In this example, the latch may behave like a wire only during a very short amount of time (i.e., the time during which the clock signal is logic '1' and the latch is in a transparent state) and like a falling edge-triggered flip-flop for the remainder of the clock period (i.e., when the pulse terminates and the clock signal transitions from logic '1' to logic '0' and the latch transitions to an opaque state). In such a scenario, the transparent-high latch stores a signal during almost the entire clock period, and the latch may be considered to operate as a pulse-triggered latch, which has a behavior that resembles that of a rising-edge triggered flip-flop.

During the power-up operation, the inverted freeze signal (NFRZ) may be set to logic '0'. Thus, control circuit 450 may generate signal LCLK to be logic '1' and signal LCLKB to be logic '0', independent of the enable signal and the clock signal (CLK).

As a result, initialization circuit 410 may set the output of multiplexer 490 to logic '1'. Buffered tri-state 440 may behave as an inverter and produce logic '0' at the input of inverter 460, which may produce logic '1' at the output of the interconnect circuit. Pull-up circuit 480 may electrically couple the voltage rail to the output of multiplexer 490, and transmission gate 426 may put pipeline storage element 420 in transparent latch mode, thereby effectively disabling pipeline element 470.

Consider the scenario in which the power-up operation has terminated, and the inverted freeze signal (NFRZ) is set to logic '1'. Consider further that the enable signal is set to logic '0', and control circuit 450 generates logic '1' for signal LCLK and logic '0' for signal LCLKB independent of the clock signal (CLK) and the inverted freeze signal (NFRZ).

In this scenario, buffered tri-state 440 may operate as an inverter, and pipeline storage element 420 may operate as a transparent latch. Initialization circuit 410 may decoupled the voltage rail from the output of multiplexer 490, and any signal out of multiplexer 490 may reach the input of tri-state buffer 440.

As an example, consider that a signal that is logic '0' is routed through multiplexer 490. In this example, tri-state buffer 440 may invert the signal at the input and produce a signal that is logic '1' at the output of tri-state buffer 440. This signal may cause pull-up circuit 480 to electrically disconnect the voltage rail from the input of tri-state buffer 440 and inverter 460 to produce a signal that is logic '0' at the output of the interconnect circuit.

As another example, consider that a signal that is logic '1' is routed through multiplexer 490. In this example, tri-state buffer 440 may invert the signal at the output of multiplexer 490 and produce a signal that is logic '0' at the output of tri-state buffer 440. The signal at the output of tri-state buffer 440 may cause pull-up circuit 480 to electrically connect the voltage rail to the input of tri-state buffer 440, thereby restoring the voltage level of the signal at the output of multiplexer 490. Inverter 460 may invert the signal at the output of tri-state buffer 440 and thereby produce a signal that is logic '1' at the output of the interconnect circuit.

Consider the scenario in which the power-up operation has terminated, and the inverted freeze signal (NFRZ) is set to logic '1'. Consider further that the enable signal is set to logic to enable pipeline element 470, and control circuit 450 generates signal LCLK as logic '1' and signal LCLKB as logic '0' when clock signal (CLK) is logic '0', and signal LCLK as logic '0' and signal LCLKB as logic '1' when clock signal (CLK) is logic '1'. In other words, after power-up operation (i.e., NFRZ is set to logic '1') and when the enable signal enables the use of pipeline element 470 (i.e., the enable signal is set to logic '1'), signals LCLKB and LCLK may behave like the clock signal (CLK) and the inverse of the clock signal (CLK), respectively.

In this scenario, transmission gate 426 of pipeline storage element 420 may disconnect the output of inverter 429 from the input of inverter 428 when signal CLK is logic '0', and transmission gate 426 may electrically couple the output of inverter 429 to the input of inverter 428 when signal CLK is logic '1'. In other words, pipeline storage element 420 may store the signal at the input of inverter 460 when signal CLK is logic '1' and be transparent when signal CLK is logic '0'.

Buffered tri-state 440 may operate as an inverter when signal CLK is logic '0' and in high-impedance mode when signal CLK is logic '1'. Initialization circuit 410 may decoupled the voltage rail from the output of multiplexer 490, and any signal out of multiplexer 490 may reach the input of tri-state buffer 440.

As an example, consider that a signal that is logic '0' is routed through multiplexer 490 and that signal CLK is logic '0'. In this example, tri-state buffer 440 may invert the signal at the input and produce a signal that is logic '1' at the output of tri-state buffer 440. This signal may cause pull-up circuit 480 to electrically disconnect the voltage rail from the input of tri-state buffer 440 and inverter 460 to produce a signal that is logic '0' at the output of the interconnect circuit.

While the signal CLK is logic '0', pipeline storage element 420 may implement a transparent latch. When signal CLK transitions from logic '0' to logic '1', pipeline storage element 420 may become opaque and store the signal at the output of tri-state buffer 440 (i.e., logic '1') in storage node 422 and the inverted signal (i.e., logic '0') in storage node 424. Additionally, tri-state buffer 440 may be in high-impedance mode when signal CLK is logic '1'. Thus, the output of the interconnect circuit may maintain logic '0' for as long as the signal CLK is logic '1'.

As another example, consider that a signal that is logic '1' is routed through multiplexer 490 and that signal CLK is logic '0'. In this example, tri-state buffer 440 may invert the signal at the input and produce a signal that is logic '0' at the output of tri-state buffer 440. This signal may cause pull-up circuit 480 to electrically connect the voltage rail from the input of tri-state buffer 440, thereby restoring the voltage level of the signal at the output of multiplexer 490. Inverter 460 may invert the signal at the output of tri-state buffer 440 and thereby produce a signal that is logic '1' at the output of the interconnect circuit.

While the signal CLK is logic '0', pipeline storage element 420 may implement a transparent latch. When signal CLK transitions from logic '0' to logic '1', pipeline storage element 420 may become opaque and store the signal at the output of tri-state buffer 440 (i.e., logic '0') in storage node 422 and the inverted signal (i.e., logic '1') in storage node 424. Additionally, tri-state buffer 440 may be in high-impedance mode when signal CLK is logic '1'. Thus, the output of the interconnect circuit may maintain logic '1' for as long as the signal CLK is logic '1'.

As shown, the output of inverter 460 may be initialized (e.g., during power-up operation) to logic '1'. As a result, pipeline storage element 420 may be initialized to store logic '0' and logic '1' in storage nodes 422 and 424, respectively. It may be desirable to store logic '1' and logic '0' in storage nodes 422 and 424 instead during initialization. Asynchronous access to pipeline storage element 420 for asynchronous reset or load operations may also be desirable. Programming element 430 may perform these memory access operations and override the signal stored in pipeline storage element 420 by overriding the signal stored in storage node 424.

As an example, consider that signal CLK is logic '1' (i.e., tri-state buffer 440 may be in high-impedance mode) and storage nodes 422 and 424 store signals that are logic '1' and logic '0', respectively. In this example, programming element 430 may pre-charge data line 432 with logic '1' and the address signal on address line 434 may be logic '1', which may electrically couple data line 432 to storage node 424, thereby overriding the signals stored in storage node 424 and 422 with signals that are logic '1' and logic '0', respectively.

As another example, consider that signal CLK is logic '1' (i.e., tri-state buffer 440 may be in high-impedance mode) and storage nodes 422 and 424 store signals that are logic '0' and logic '1', respectively. In this example, programming element 430 may pre-charge data line 432 with logic '0' and the address signal on address line 434 may be logic '1', which may electrically couple data line 432 to storage node 424, thereby overriding the signals stored in storage node 424 and 422 with signals that are logic '0' and logic '1', respectively.

Figure 5:
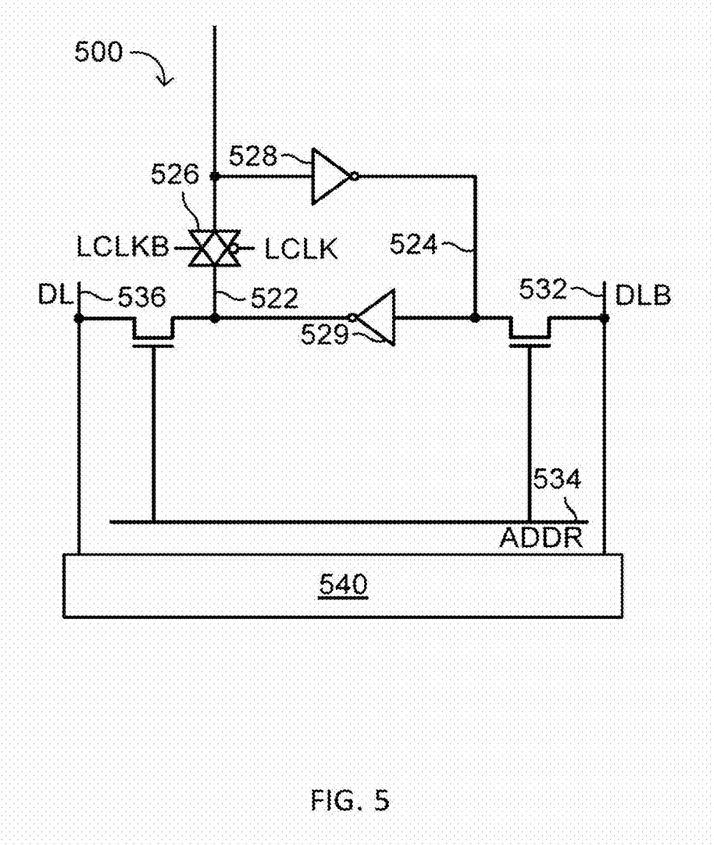
FIG. 5 is a diagram of an illustrative pipeline element with read access and write access through a data line, an inverse data line, and an address line in accordance with an embodiment.

As shown, programming element 430 may only perform a write operation on pipeline storage element 420 by overriding the signals stored in storage nodes 422 and 424. For some applications such as testing and/or debugging a circuit implementation, it may be desirable to perform a read operation on pipeline storage element 420. FIG. 5 shows an embodiment of a pipeline element that may provide read and write access.

As shown, pipeline element 500 may include inverters 528 and 529 and transmission gate 526, which may be controlled by signals LCLK and LCLKB. A control circuit such as control circuit 450 of FIG. 4 may generate signals LCLK and LCLKB. When signals LCLK and LCLKB are logic '0' and logic '1', respectively, transmission gate 526 may behave like a closed circuit, and cross-coupled inverters 528 and 529 may form a latch with first and second storage nodes 522 and 524, respectively, that is in opaque (or non-transparent) mode. Similarly, when signals LCLK and LCLKB are logic '1' and logic '0', respectively, transmission gate 526 may behave like an open circuit and the latch formed by cross-coupled inverters 528 and 529 may behave like a transparent latch.

A first pass transistor may couple data line 536 to storage node 522, and a second pass transistor may couple inverse data line 532 to storage node 524. Circuit 540 may include data line drivers and sense amplifiers, and address line 534 may control the two pass transistors.

As an example for a write operation, consider that signal LCLK is logic '0' and LCLKB is logic '1' (i.e., the latch formed by inverters 528 and 529 is in opaque mode) and storage nodes 522 and 524 store signals that are logic '1' and logic '0', respectively. In this example, data line drivers in circuit 540 may pre-charge inverse data line (DLB) 532 with logic '1' and data line (DL) 536 with logic '0'. The address signal on address line 534 may be logic '1', which may electrically couple inverse data line 532 to storage node 524 and data line 536 to storage node 522, thereby overriding the signals stored in storage node 524 and 522 with signals that are logic '1' and logic '0', respectively.

As another example for a write operation, consider that signal LCLK is logic '0' and LCLKB is logic '1' (i.e., the latch formed by inverters 528 and 529 is in opaque mode) and storage nodes 522 and 524 store signals that are logic '0' and logic '1', respectively. In this example, data line drivers in circuit 540 may pre-charge inverse data line (DLB) 532 with logic '0' and data line (DL) 536 with logic '1'. The address signal on address line 534 may be logic '1', which may electrically couple inverse data line 532 to storage node 524 and data line 536 to storage node 522, thereby overriding the signals stored in storage node 524 and 522 with signals that are logic '0' and logic '1', respectively.

As an example for a read operation, consider that signal LCLK is logic '0' and LCLKB is logic '1' (i.e., the latch formed by inverters 528 and 529 is in opaque mode) and storage nodes 522 and 524 store signals that are logic '1' and logic '0', respectively. In this example, data line drivers in circuit 540 may pre-charge both, inverse data line (DLB) 532 and data line (DL) 536 with logic '1'. The address signal on address line 534 may be logic '1', which may electrically couple inverse data line 532 to storage node 424 and data line 536 to storage node 522. Storage node 524 may discharge inverse data line 532, and the sense amplifiers in circuit 540 may convert the voltage difference between data line 536 and inverse data line 532 to indicate that storage node 522 stores logic '1'.

As another example for a read operation, consider that signal LCLK is logic '0' and LCLKB is logic '1' (i.e., the latch forced by inverters 528 and 529 is in opaque mode) and storage nodes 522 and 524 store signals that are logic '0' and logic '1', respectively. In this example, data line drivers in circuit 540 may pre-charge both, inverse data line (DLB) 532 and data line (DL) 536 with logic '1'. The address signal on address line 534 may be logic '1', which may electrically couple inverse data line 532 to storage node 424 and data line 536 to storage nods 522. Storage node 522 may discharge data line 532, and the sense amplifiers in circuit 540 may convert the voltage difference between data line 536 and inverse data line 532 to indicate that storage node 522 stores logic '0'.

Figure 6:
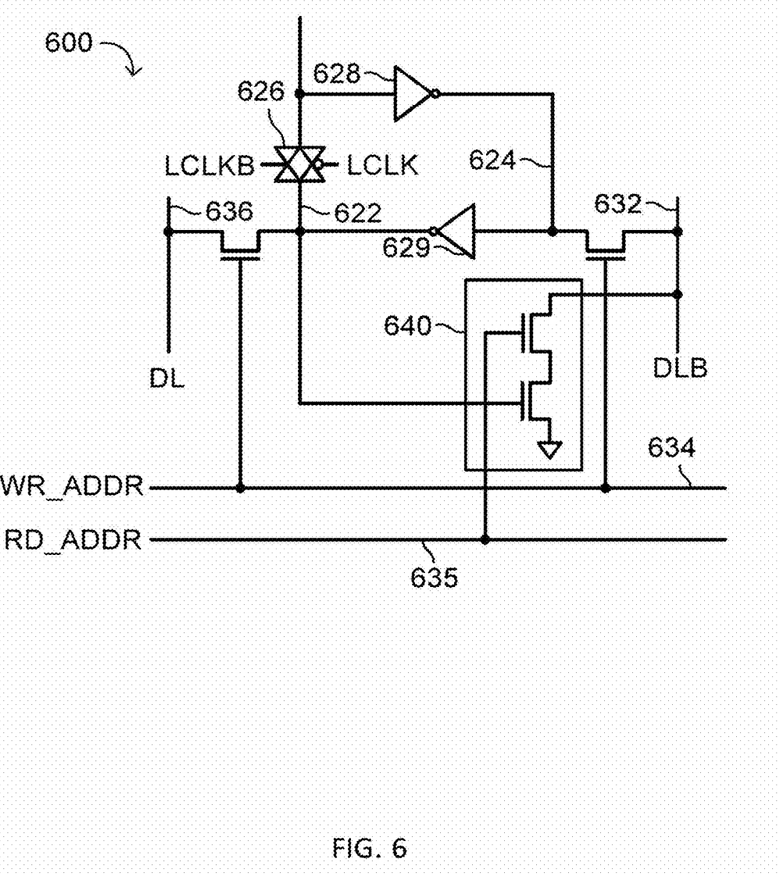
FIG. 6 is a diagram of an illustrative pipeline element similar to the pipeline element in FIG. 5 with read access through a separate read port in accordance with an embodiment.

If desired, two transistors may be added to pipeline element 500 to form a buffered read port. Such a read port may provide non-destructive read access to pipeline element 500, and thereby enable read operations for online testing and in-system debug. An embodiment of a pipeline element with buffered read port is shown in FIG. 6.

As shown, pipeline element 600 may include inverters 628 and 629 and transmission gate 626, which may be controlled by signals LCLK and LCLKB. A control circuit such as control circuit 450 of FIG. 4 may generate signals LCLK and LCLKB. When signals LCLK and LCLKB are logic '0' and logic '1', respectively, transmission gate 626 may behave like a closed circuit, and cross-coupled inverters 623 and 629 may form a latch with first and second storage nodes 622 and 624, respectively, that is in opaque (or non-transparent) mode. Similarly, when signals LCLK and LCLKB are logic '1' and logic '0', respectively, transmission gate 626 may behave like an open circuit and the latch formed by cross-coupled inverters 628 and 629 may behave like a transparent latch.

A first pass transistor may couple data line 636 to storage node 622, and a second pass transistor may couple inverse data line 632 to storage node 624. Pipeline element 600 may further include data line drivers and sense amplifiers (not shown), and write address line 634 may control the two pass transistors.

Pipeline element 600 may further include buffered read port 640. As shown, buffered read port 640 may include two transistors that are coupled in series between the inverse data line and a ground voltage rail. Read address line 635 may control one of the two transistors, and storage node 622 may control the other one of the two transistors.

As an example for a write operation, consider that signal LCLK is logic '0' and LCLKB is logic '1' (i.e., the latch formed by inverters 628 and 629 is in opaque mode) and storage nodes 622 and 624 store signals that are logic '1' and logic '0', respectively. In this example, data line drivers (not shown) may pre-charge inverse data line (DLB) 632 with logic '1' and data line (DL) 636 with logic '0'. The write address signal on write address line 634 may be logic '1', which may electrically couple inverse data line 632 to storage node 624 and data line 636 to storage node 622, thereby overriding the signals stored in storage node 624 and 622 with signals that are logic '1' and logic '0', respectively.

As another example for a write operation, consider that signal LCLK is logic '0' and LCLKB is logic '1' (i.e., the latch formed by inverters 628 and 629 is in opaque mode) and storage nodes 622 and 624 store signals that are logic '0' and logic '1', respectively. In this example, data line drivers (not shown) may pre-charge inverse data line (DLB) 632 with logic '0' and data line (DL) 636 with logic '1'. The write address signal on write address line 634 may be logic '1', which may electrically couple inverse data line 632 to storage node 624 and data line 636 to storage node 622, thereby overriding the signals stored in storage node 624 and 622 with signals that are logic '0' and logic '1', respectively.

As an example for a read operation, consider that signal LCLK is logic '0' and LCLKB is logic '1' (i.e., the latch formed by inverters 628 and 629 is in opaque mode) and storage nodes 622 and 624 store signals chat are logic '1' and logic '0', respectively. In this example, data line drivers in circuit 640 may pre-charge inverse data line (DLB) 632 with logic '1' . The read address signal on address line 635 may be logic '1', and since storage node 622 stores logic '1', buffered read port 640 may discharge inverse data line 632. A sense amplifier (not shown) may invert inverse data line 632 to indicate that storage node 622 stores logic '1'.

As another example for a read operation, consider that signal LCLK is logic '0' and LCLKB is logic '1' (i.e., the latch formed by inverters 628 and 629 is in opaque mode) and storage nodes 622 and 624 store signals that are logic '0' and logic '1', respectively. In this example, data line drivers in circuit 640 may pre-charge inverse data line (DLB) 632 with logic '1'. The read address signal on address line 635 may be logic '1', and since storage node 622 stores logic '0', inverse data line 632 remains logic '1'. A sense amplifier (not shown) may invert inverse data line 632 to indicate that storage node 622 stores logic '0'.

If desired, buffered read port 640 may be implemented in a different way. For example, buffered read port 640 may include two transistors that are coupled in series between data line 636 and a ground voltage rail. Read address line 635 may control one of the two transistors, and storage node 624 may control the other one of the two transistors. As another example, pipeline element 600 may include two buffered read ports, one buffered read port (as shown) that is controlled by a read address and storage node 622 and that couples two transistors in series between inverse data line 632 and a ground rail and another buffered read port (not shown) that is controlled by a read address and storage node 624 and that couples two transistors between data line 622 and a ground rail. In this case, a sense amplifier may convert the differential voltage between data line 636 and inverse data line 632 to indicate the logic level of the signals stored in storage nodes 622 and 624, respectively.

An integrated circuit may include multiple interconnect circuits such as the interconnect circuits shown in FIGS. 4, 5, and 6. Each interconnect circuit may have an individual address line or an individual read and an individual write address line, all of which are sometimes also referred to as address lines, that are not shared with other interconnect circuits. Similarly, each data line and each inverse data line, which are sometimes also referred to as data lines or differential data lines, may connect to a single interconnect circuit. If desired, at least some of the multiple interconnect circuits may use the same address lines and/or the same data lines.

For example, an integrated circuit may have multiple address lines and multiple data lines with each programming element in an interconnect circuit connected to a unique pair of address lines and data lines. In other words, any two interconnect circuits in the integrated circuit may either be coupled to different address lines, different data lines, or both.

If desired, at least some of the address lines and/or at least some of the data lines may provide access to additional circuitry in an integrated circuit. For example, the programmable logic device (PLD) 100 shown in FIG. 1 may provide access to configuration memory using at least some of the address lines and/or at least some of the data lines that are connected to programming elements (e.g., programming element 430 of FIG. 4).

Figure 7:
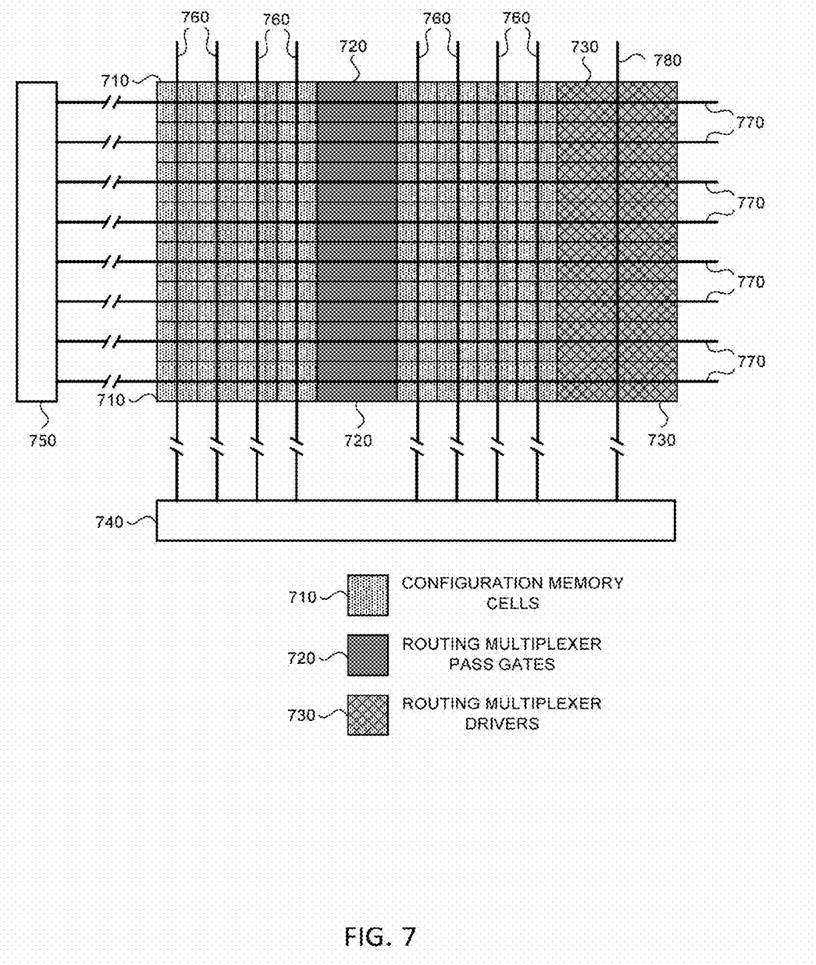
FIG. 7 is a diagram of an illustrative array of address lines and data lines that provide access to the pipeline element in accordance with an embodiment.

FIG. 7 is a diagram of an illustrative array of address lines and data lines in an integrated circuit with at least some of the address lines and/or at least some of the data lines shared between configuration memory cells and programming elements of routing multiplexer drivers.

As shown in FIG. 7, the integrated circuit may include an array of configuration memory cells 710, routing multiplexer pass gates 720, and routing multiplexer drivers 730. At least some of the routing multiplexer drivers 730 may include a pipeline element with a programming element such as programming element 430 of FIG. 4.

As an example, consider that the integrated circuit further includes blocks 740 and 750 and that block 750 includes address line drivers and block 740 includes data line drivers and sense amplifiers. In this example, wires 770 may represent address lines and wires 760 and 780 may represent data lines, thus 740 may include data line circuitry and 750 address circuitry. As shown, the address lines may be shared between configuration memory cells 710 and routine multiplexer drivers 730. However, routing multiplexer drivers 730 may have different data lines (i.e., wires 780) that are separate from the data lines (i.e., wires 760) that connect to configuration memory cells 710.

As another example, consider that block 740 includes address line drivers and block 750 includes data line drivers and sense amplifiers. In this example, wires 770 may represent data lines and wires 760 and 780 may represent address lines, thus 740 may include address circuitry and 750 data line circuitry. As shown, the data lines may be shared between configuration memory cells 710 and routing multiplexer drivers 730. However, routing multiplexer drivers 730 may have different address lines (i.e., wires 780) that are separate from the address lines (i.e., wires 760) that connect to configuration memory ceils 710.

Figure 8:
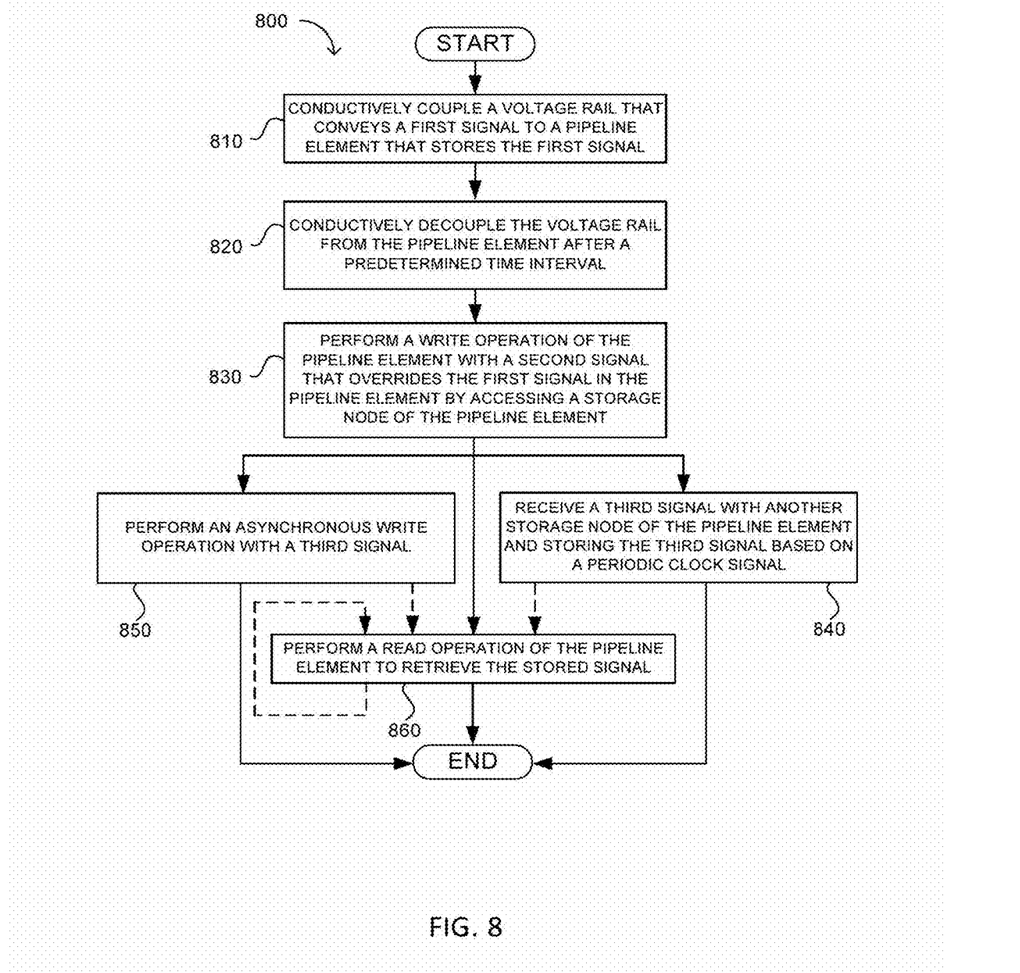
FIG. 8 is a flow chart showing illustrative steps for accessing a pipeline element in an interconnect circuit on an integrated circuit in accordance with an embodiment.

FIG. 8 shows a flow chart with illustrative steps for accessing a pipeline element such as pipeline element 470 of FIG. 4, pipeline element 500 of FIG. 5, or pipeline element 600 of FIG. 6 in interconnect circuitry on an integrated circuit.

During step 810, a control signal (e.g., the inverted freeze signal (NFRZ) of FIG. 4) may electrically couple a voltage rail that conveys a first signal to a pipeline element that stores the first signal. After a predetermined time interval (e.g., after all power-up operations have terminated), the control signal may electrically decouple the voltage rail from the pipeline element during step 820.

During step 830, a programming circuit (e.g., programming circuit 430 of FIG. 4) may perform a write operation of the pipeline element with a second signal that overrides the first signal in the pipeline element by accessing a storage node of the pipeline element. During step 840, the interconnect circuitry may receive a third signal, and the pipeline element may store the third signal with another storage node based on a periodic clock signal.

If desired, the programming circuit may perform an asynchronous write operation of the pipeline element with a third signal during step 850. During step 860, pass transistors together with address line, data line, inverse data line, and sense amplifiers (e.g., as shown in FIG. 5) may perform a read operation of the pipeline element to retrieve the second signal.

If desired, the read operation of step 860 may be repeated. The read operation of step 860 may also be performed after receiving a third signal with another storage node of the pipeline element and storing the third signal based on a periodic clock signal (i.e., after step 840) or after an asynchronous write operation with a third signal (i.e., step 850).

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using pipelined interconnect circuitry and read and/or write access to storage nodes is desirable.

Although the method operations were described in specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:
1. An integrated circuit, comprising:
an interconnect circuit that routes a signal from a first circuit on the integrated circuit to a second circuit on the integrated circuit, wherein the interconnect circuit comprises a pipeline storage element that stores the signal and that is addressable to provide access to the pipeline storage element, wherein the pipeline storage element comprises first and second inverters each having a respective input and output, wherein the input of the first inverter is coupled to the output of the second inverter, and wherein the input of the second inverter is coupled to the output of the first inverter, and wherein the interconnect circuit further comprises:
a transmission gate having a first terminal connected to the output of the first inverter and a second terminal connected to the input of the second inverter; and
a control circuit configured to generate a control signal that controls the transmission gate, wherein the control circuit is further configured to adjust the control signal to place the pipeline storage element in a transparent latch mode or a non-transparent latch mode.

2. The integrated circuit of claim 1 wherein the transmission gate comprises an n-channel transistor and a p-channel transistor connected in parallel.

3. The integrated circuit of claim 2, wherein the interconnect circuit further comprises:
a tri-state buffer having a first input configured to receive the signal from the first circuit and a second input configured to receive the control signal from the control circuit, wherein the tri-state buffer selectively inverts the received signal based on the control signal.

4. The integrated circuit of claim 2, wherein the control circuit comprises:
a logic NAND gate that receives first and second additional signals, wherein the logic NAND gate controls at least a portion of the transmission gate based on the first and second additional signals.

5. The integrated circuit of claim 4, wherein the control circuit further comprises:
a configuration memory that is coupled to the logic NAND gate and that stores the first additional signal.

6. The integrated circuit of claim 1, wherein the interconnect circuit further comprises:
an address line;
a data line;
a transistor that is coupled to the data line, the address line, and the pipeline storage element, wherein the transistor provides access to the pipeline storage element via the address line and the data line.

7. The integrated circuit of claim 6, wherein the interconnect circuit further comprises:
an inverted data line;
an additional transistor that is coupled to the inverted data line, the address line, and the pipeline storage element, wherein the additional transistor provides access to the pipeline storage element via the address line and the inverted data line.

8. The integrated circuit of claim 6, wherein the interconnect circuit further comprises:
an additional data line; and
a plurality of configuration memory cells, wherein each configuration memory cell of the plurality of configuration memory cells is configurable via the address line and the additional data line.

9. The integrated circuit of claim 6, wherein the interconnect circuit further comprises:
an additional address line; and
a plurality of configuration memory cells, wherein each configuration memory cell of the plurality of configuration memory cells is configurable via the data line and the additional address line.

10. The integrated circuit of claim 1, wherein the interconnect circuit further comprises:
a multiplexer that is coupled between the first circuit, a third circuit and the second circuit, wherein the multiplexer is controlled to select the signal from the first circuit.

11. The integrated circuit of claim 1, wherein the integrated circuit is a programmable logic device.

12. Pipelined interconnect circuitry, comprising:
a first inverter gate having a first input configured to receive an input signal and a second input configured to receive a control signal, wherein the second input is different than the first input;
a second inverter gate that is coupled to the first inverter gate;
a latch with first and second storage nodes, wherein the first storage node is coupled to the first inverter gate; and
a programming circuit that is directly connected to the second storage node of the latch, wherein the programming circuit enables access to the latch.

13. The circuitry of claim 12, wherein the programming circuit further comprises:
a pass transistor coupled to the second storage node of the latch;
a data line coupled to the pass transistor; and
an address line coupled to the pass transistor, wherein the address line controls connectivity between the data line and the second storage node of the latch.

14. The circuitry of claim 13, further comprising:
an inverted data line; and
an additional pass transistor that is coupled between the inverted data line and the first storage node of the latch, wherein the address line controls connectivity between the inverted data line and the first storage node of the latch.

15. The circuitry of claim 13, further comprising:
an additional address line that carries an address signal; and
a read port coupled between the first storage node of the latch, the additional address line, and the inverted data line, wherein the read port discharges the inverted data line based on the address signal and a signal stored in the first storage node.

16. The circuitry of claim 12, wherein the latch further comprises:
a transmission gate that is controlled by the control signal.

17. The circuitry of claim 12, further comprising:
a logic NAND gate that receives first and second signals, wherein the logic NAND gate generates the control signal based on the first and second signals.

18. The circuitry of claim 17, further comprising:
a configuration memory element that stores one of the first and second signals.

19. The circuitry of claim 12, further comprising:
a routing multiplexer having multiple inputs and an output, wherein the output is coupled to the first inverter gate.

20. The circuitry of claim 19, further comprising:
a pull-up transistor coupled in feedback with the first inverter gate, wherein the pull-up transistor has a drain terminal that is coupled to the output of the routing multiplexer.

21. The circuitry of claim 12, wherein the latch comprises at least two cross-coupled inverters that are separate from the first inverter gate and the second inverter gate.

22. The circuitry of claim 12, wherein the latch is coupled between the first inverter gate and the second inverter gate.

23. The circuitry of claim 12, wherein the control signal comprises a clock signal.

24. The integrated circuit of claim 1, wherein the first circuit comprises a first multiplexer and a first driver, and wherein the second circuit comprises a second multiplexer and a second driver.

* * * * *